United States Patent Office 3,189,258
Patented June 15, 1965

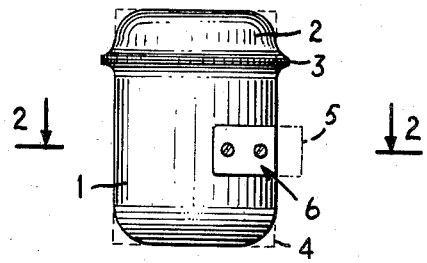
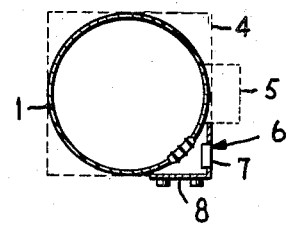
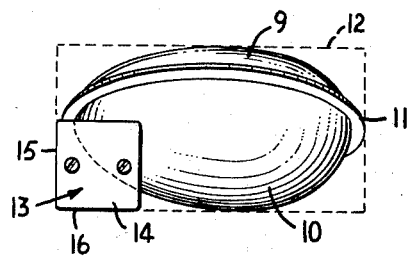
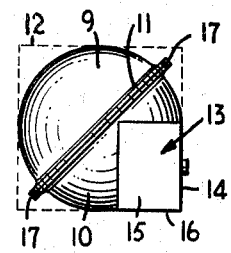
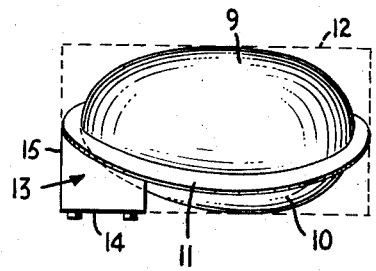
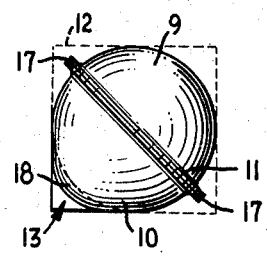

3,189,258
MOTOR COMPRESSOR CAPSULE WITH
ELECTRICAL TERMINAL BOX
Bendt Wegge Larsen, Nordborg, Denmark, assignor to
Danfoss A/S, Nordborg, Denmark, a company of
Denmark
Filed Apr. 9, 1963, Ser. No. 271,800
Claims priority, application Germany, Apr. 10, 1962,
D 38,634
10 Claims. (Cl. 230—58)

This invention relates to a refrigeration unit and is more particularly concerned with a refrigeration unit of the type in which a hermetically-sealed casing or capsule encloses the motor compressor of a refrigeration system.

The space occupied in the cabinet of a refrigerator, or of any other refrigeration appliance, by the capsule which contains the motor compressor of a hermetically-sealed refrigeration system, and the electrical terminal box which is associated with it, is space which is taken away from the storage compartment of the cabinet. It is, therefore, a goal of all manufacturers of such devices to keep the capsule and the associated terminal box as small as possible. However, the size of the capsule is determined by the size of the enclosed motor compressor aggregate. A reduction in the size of the capsule, therefore, is possible only in very rare cases. Furthermore, the size of the electrical terminal box cannot readily be reduced, since the number and size of the parts which must be housed in the terminal box are not generally variable.

The motor compressor capsule is usually disposed in a recess, readily accessible from the outside, in one of the walls, e.g. the back wall, of the refrigeration cabinet, usually at the bottom of the wall, e.g. at the junction of the rear wall and the bottom of the cabinet. In this case, the terminal box is attached to the capsule in such manner that its cover is directed to the outside. For this reason, the depth dimension of the recess has conventionally been determined by the combined depth of the capsule and terminal box.

It is an object of this invention to provide a capsule and terminal box construction which makes possible a reduction in the size of the recess in the refrigeration cabinet required to house the motor compressor unit.

In accordance with the invention, many cubic inches of cooling space can be gained by a construction in which the terminal box is constructed and secured to the capsule so that its walls lie in planes which coincide with or lie within the faces of an imaginary plane-faced geometrical figure, more particularly a right parallelepiped, or hexahedron, which is visualized as circumscribing the capsule and which will hereinafter be referred to as the "circumscribing body." Expressed in another way, the walls of the box lie in planes which contain the sides of rectangles which circumscribe the capsule. In the construction of this invention, the terminal box is housed completely within the space formerly needed to house the capsule alone and, therefore, the depth of the recess in the cabinet can be reduced accordingly.

It is known that the walls of capsule recesses which adjoin the storage space can be rounded and beveled to conform to the shape of the capsule and thus the volume of the storage space can be increased. This is, however, of no avail on the opposite side of the capsule, i.e. the outer side of the cabinet where the recess is open and where the capsule and the terminal box must not extend beyond the plane of the side and back walls of the casing. In the construction of the invention, the use of a rounded inner recess surface can be combined with the inherent compactness of the capsule and terminal box assembly to insure a maximum gain in storage space in the cabinet.

It is particularly advantageous if two adjoining walls of the terminal box coincide with two adjoining faces of the circumscribing body. In such a construction the available space is utilized particularly efficiently.

A feature of the invention is that the terminal box is mounted at a corner of the circumscribing body. Because the capsule is normally rounded in the area of its rear side, an especially large amount of space for the terminal box exists at a rear corner of the capsule. A construction can thus be provided in which the walls of the terminal box do not extend or project beyond any of the three sides of the circumscribing body at a corner, viz. the third boundary wall of the terminal box coincides with a third face of the circumscribing body. Thus, the terminal box is bounded primarily by three sides which are perpendicular to each other. Any or all of these sides can be formed as a cover. Therefore, the terminal box can easily be reached, regardless of whether the capsule is mounted in a horizontal or in a vertical position, or whether it must be reached from the bottom, from the front or from the side.

An even further increase in the space available for the terminal box can be obtained if the portion of the capsule carrying the terminal box narrows more than the other portion. In many cases, this is entirely possible since the motor compressor aggregate contained in the capsule with all its structural parts, does not have the same diameter all over.

It is also advantageous to place the plane of the welding flange of the capsule, which extends outwardly, in a position which is substantially diagonal with respect to the circumscribed body and which does not intercept the corner which is provided for the terminal box. By reason of these relationships, the welding flange which normally projects beyond the capsule wall will, at least with respect to two of the three main dimensions (length, width, height) not project beyond the circumscribed body and therefore minimizes the space needed to accommodate the capsule assembly.

By applying the same basic principles, bulges in the capsule, e.g. to accommodate the radially-projecting compressor cylinder, can be disposed diagonally in such manner that they also lie inside the imaginary circumscribed body.

Further characteristics, objects and features of the invention will be readily apparent from the following detailed description of several embodiments of the invention, taken in connection with the accompanying drawing, wherein FIG. 1 is a side elevational view of a cup-shaped capsule with associated terminal box embodying features of the invention;

FIG. 2 is a cross-sectional view of the capsule of FIG. 1, in profile, as seen along the line A—A of FIG. 1;

FIG. 3 is a side elevational view of an oval capsule with associated terminal box in accordance with the invention;

FIG. 4 is a top view of the capsule shown in FIG. 3;

FIG. 5 is an elevational view of the capsule of FIG. 3, as seen from the left of FIG. 3; and FIG. 6 is an elevational view of the capsule of FIG. 3, as seen from the right of FIG. 3.

In FIGS. 1 and 2 there is shown a conventional cup-shaped capsule consisting of a lower or body portion 1 and an upper or cover portion 2, the two portions being welded together along the circular rim or flange 3 which extends outwardly. This capsule can be circumscribed by the circumscribing body 4, shown in broken lines. The broken lines 5 show the position of the terminal box as it would be mounted in accordance with conventional practice.

In accordance with the invention, however, the terminal box 6 is mounted in such manner its two walls 7 and 8 coincide with two adjoining faces of the circumscribing body 4. It can be seen that the terminal box does not project beyond the basic dimensions of the capsule and, therefore, does not require additional space. In the drawing, the side wall 8 of the box is constructed as a cover. However, side wall 7 could also serve as the cover.

In the embodiment of FIGS. 3 to 6, an oval capsule is defined by an upper or cover portion 9 and a lower or body portion 10 connected together along the flange 11 which projects outwardly. Such a capsule can be circumscribed by the circumscribing body 12, which, as could be the case in the embodiment of FIGS. 1-2, circumscribes the capsule by including the flange 11.

In this case, the terminal box 13 is located in a corner of the circumscribing body 12. The three boundary walls 14, 15, and 16 each coincides with a face of the circumscribing body. In the embodiment illustrated, the side wall 14 serves as the cover. However, the two side walls 15 and 16 could also be constructed as covers so that the interior of the terminal box can be reached from the front, from below or from the side.

The oval-shaped capsule narrows more sharply along the portion which carries the terminal box 13 than the remaining portion. Thus, more space is available for the terminal box than would be the case if the capsule were symmetrical or uniformly curved throughout its longitudinal center plane. The plane of the welding flange 11 is inclined in this embodiment. It lies approximately along a diagonal plane of the circumscribing body 12, which does not intercept the terminal box 14, as seen in FIGS. 5 and 6. By reason of this inclination of the flange, the outside edges 17 of the welding flange, at least in two of the three main dimensions, in this case in height and width, does not project beyond the faces of the circumscribing body 12. Similar results can be obtained for other pairs of main dimensions when the plane of the welding flange is positioned, as shown for example in FIG. 3, in a diagonal plane running from the upper left to the lower right or, as shown in FIG. 4, in a diagonal plane running from the upper left to the lower right.

The capsule suitably has a bulge 18 which is necessary for accommodating the cylinder of the motor compressor which is normally enclosed within the capsule. This bulge is inclined in such manner, as seen in FIG. 6, that it is also completely contained inside the circumscribing body 12.

These principles can also be applied to other forms of capsules, for instance for the form consisting of two dish-shaped shells or cups.

While the invention has thus been illustrated and described with reference to certain preferred embodiments thereof, it will be obvious that various changes and modifications in addition to those above mentioned may be made without departing from the scope of the invention as defined in the appended claims. It will further be understood that, insofar as they are not mutually incompatible, the various features and details of construction of the several embodiments shown and described are interchangeable with one another. It is intended, therefore, that all matter contained in the foregoing description and in the drawing shall be interpreted as illustrative only and not as limitative of the invention.

Reference is made to the application of Mads Clausen Serial No. 271,799, filed April 9, 1963, and entitled "Motor Compressor Capsule With External Welding Flange," being filed concurrently herewith.

I claim:
1. A motor compressor hermetic capsule and an electrical terminal box attached thereto, said terminal box being disposed inside a space bounded by the capsule and by two intersecting planes defining an imaginary plane-faced parallelepiped figure circumscribing the capsule.

2. A motor compressor capsule as defined in claim 1, wherein two walls of the terminal box coincide with said two intersecting planes of the circumscribing figure.

3. A motor compressor capsule as defined in claim 1, wherein the terminal box is disposed in one corner of said circumscribing figure.

4. A motor compressor capsule as defined in claim 2, wherein the terminal box is disposed in one corner of the circumscribing figure.

5. A motor compressor capsule as defined in claim 2, wherein said terminal box comprises a third wall coinciding with a third plane defining the circumscribing figure.

6. A motor compressor capsule as defined in claim 1, wherein the capsule narrows to a greater extent in the portion carrying the terminal box than in the remainder thereof.

7. A motor compressor capsule as defined in claim 3, wherein the capsule narrows to a greater extent in a portion carrying the terminal box than in the remainder thereof.

8. A motor compressor capsule as defined in claim 1, wherein the capsule comprises two sections having said sections connected along a welding flange which projects outwardly, and wherein said flange is disposed approximately within the circumscribing figure in such manner that it does not intercept the space occupied by the terminal box.

9. A motor compressor capsule as defined in claim 6, wherein the capsule is formed from two sections connected along a welding flange which projects outwardly, and wherein the welding flange lies approximately within the circumscribed figure in such manner that it does not intercept the space occupied by the terminal box.

10. A motor compressor capsule as defined in claim 1, wherein the capsule is formed with a bulge and the bulge is positioned to lie wholly within the circumscribed figure.

References Cited by the Examiner
UNITED STATES PATENTS

| | | | |
|---|---|---|---|
| 1,998,604 | 4/35 | Belden | 230—139 X |
| 2,134,142 | 10/38 | Orear | 230—58 X |
| 2,905,372 | 9/59 | La Flame | 230—58 |

LAURENCE V. EFNER, *Primary Examiner.*
ROBERT M. WALKER, *Examiner.*